(12) United States Patent
Halander et al.

(10) Patent No.: US 12,552,729 B2
(45) Date of Patent: Feb. 17, 2026

(54) MECHANICALLY-GASSED EMULSION EXPLOSIVES AND METHODS RELATED THERETO

(71) Applicant: Dyno Nobel Inc., Salt Lake City, UT (US)

(72) Inventors: John B. Halander, Salt Lake City, UT (US); Casey L. Nelson, Murray, UT (US); Cornelis L. Kome, Salt Lake City, UT (US)

(73) Assignee: Dyno Nobel Inc., Salt Lake City, UT (US)

( * ) Notice: Subject to any disclaimer, the term of this patent is extended or adjusted under 35 U.S.C. 154(b) by 822 days.

(21) Appl. No.: 17/815,776

(22) Filed: Jul. 28, 2022

(65) Prior Publication Data

US 2022/0363610 A1 Nov. 17, 2022

Related U.S. Application Data

(63) Continuation of application No. 16/258,298, filed on Jan. 25, 2019, now Pat. No. 11,427,515.

(60) Provisional application No. 62/623,324, filed on Jan. 29, 2018.

(51) Int. Cl.
*C06B 23/00* (2006.01)
*C06B 47/14* (2006.01)
*F42D 1/10* (2006.01)

(52) U.S. Cl.
CPC ............ *C06B 23/002* (2013.01); *C06B 23/00* (2013.01); *C06B 47/145* (2013.01); *F42D 1/10* (2013.01)

(58) Field of Classification Search
None
See application file for complete search history.

(56) References Cited

U.S. PATENT DOCUMENTS

| | | | |
|---|---|---|---|
| 3,004,842 A | 10/1961 | Charles | |
| 3,397,097 A | 8/1968 | Atadan et al. | |
| 3,447,978 A | 6/1969 | Bluhm | |
| 3,545,838 A | 12/1970 | Levin et al. | |
| 3,783,053 A | 1/1974 | Oettmeier et al. | |
| 3,788,909 A * | 1/1974 | Udy ................ | C06B 47/14 149/44 |
| 4,072,243 A | 2/1978 | Conant et al. | |
| 4,084,934 A | 4/1978 | Kumazawa | |
| 4,118,447 A | 10/1978 | Richter | |

(Continued)

FOREIGN PATENT DOCUMENTS

| | | |
|---|---|---|
| CA | 2294893 A1 | 1/1999 |
| CN | 103108848 A | 5/2013 |

(Continued)

OTHER PUBLICATIONS

International Search Report and Written Opinion dated Nov. 30, 2022 for PCT/US2022/074895.

(Continued)

*Primary Examiner* — Aileen B Felton
(74) *Attorney, Agent, or Firm* — Dorsey & Whitney LLP

(57) ABSTRACT

Emulsion explosives with gas bubbles that are resistant to in-borehole migration or coalescence are disclosed herein. Such emulsions can be sensitized by mechanically-introducing gas bubbles into the emulsion. Resistance to gas bubble migration and coalescence can be achieved by homogenization, without the need for bubble stabilization agents.

18 Claims, 2 Drawing Sheets

(56) References Cited

U.S. PATENT DOCUMENTS

| | | | |
|---|---|---|---|
| 4,125,640 A | 11/1978 | Conant et al. | |
| 4,195,548 A | 4/1980 | Clay et al. | |
| 4,259,977 A | 4/1981 | Brockington | |
| 4,273,147 A | 6/1981 | Olney | |
| 4,491,489 A | 1/1985 | Ellis et al. | |
| 4,521,349 A | 6/1985 | Weber et al. | |
| 4,555,278 A | 11/1985 | Cescon et al. | |
| 4,676,847 A | 6/1987 | Lin | |
| 4,676,849 A | 6/1987 | Curtin et al. | |
| 4,693,765 A | 9/1987 | Stromquist et al. | |
| 4,780,156 A | 10/1988 | Sheeran et al. | |
| 4,790,891 A | 12/1988 | Halliday et al. | |
| 4,840,687 A * | 6/1989 | Forsberg | C06B 45/00 149/46 |
| 4,848,749 A | 7/1989 | Schneider | |
| 4,867,920 A | 9/1989 | Sudweeks et al. | |
| 4,936,933 A | 6/1990 | Yabsley et al. | |
| 4,966,077 A | 10/1990 | Halliday et al. | |
| 4,997,494 A | 3/1991 | Nguyen | |
| 5,151,187 A | 9/1992 | Behmann | |
| 5,322,576 A | 6/1994 | Aitken et al. | |
| 5,346,564 A | 9/1994 | Vance et al. | |
| 5,366,571 A | 11/1994 | Ruhe et al. | |
| 5,524,523 A | 6/1996 | Luebbe et al. | |
| 5,686,685 A | 11/1997 | McDonald et al. | |
| 5,874,688 A | 2/1999 | Luebbe et al. | |
| 6,113,715 A | 9/2000 | Halander et al. | |
| 6,210,122 B1 | 4/2001 | Broendbo | |
| 6,261,393 B1 | 7/2001 | Vestre | |
| 6,372,842 B1 | 4/2002 | Grisso et al. | |
| 6,397,754 B1 | 6/2002 | Perlid | |
| 6,435,096 B1 | 8/2002 | Watson | |
| 6,520,089 B1 | 2/2003 | Avanci et al. | |
| 6,539,870 B1 * | 4/2003 | Granholm | C06B 33/04 149/108.4 |
| 6,557,448 B2 | 5/2003 | Delagey et al. | |
| 6,651,564 B1 | 11/2003 | Tite et al. | |
| 6,783,799 B1 | 8/2004 | Goodson | |
| 6,808,573 B2 | 10/2004 | Hales et al. | |
| 6,877,432 B2 | 4/2005 | Thomson et al. | |
| 6,913,251 B2 | 7/2005 | Kerfoot | |
| 6,942,744 B2 | 9/2005 | Palmer | |
| 6,949,153 B2 | 9/2005 | Gomez et al. | |
| 7,459,496 B2 | 12/2008 | Hsu et al. | |
| 7,645,380 B2 | 1/2010 | Kerfoot | |
| 7,771,550 B2 | 8/2010 | Halander et al. | |
| 7,980,312 B1 | 7/2011 | Hill et al. | |
| 8,096,119 B2 | 1/2012 | Baughman et al. | |
| 8,114,231 B2 | 2/2012 | Da Silva et al. | |
| 8,235,117 B1 | 8/2012 | Hill et al. | |
| 8,261,823 B1 | 9/2012 | Hill et al. | |
| 8,276,517 B2 | 10/2012 | Poleg et al. | |
| 8,381,653 B2 | 2/2013 | Zimmermann | |
| 8,403,904 B2 | 3/2013 | Tian et al. | |
| 8,512,489 B2 | 8/2013 | Rancourt | |
| 8,647,317 B2 | 2/2014 | Tian et al. | |
| 8,678,354 B2 | 3/2014 | Kerfoot | |
| 8,820,242 B2 | 9/2014 | Alexander | |
| 9,085,972 B1 | 7/2015 | Hill et al. | |
| 9,207,055 B2 | 12/2015 | Halander et al. | |
| 2002/0009622 A1 | 1/2002 | Goodson | |
| 2004/0055678 A1 | 3/2004 | Hales et al. | |
| 2004/0174171 A1 | 9/2004 | Desie et al. | |
| 2004/0247534 A1 | 12/2004 | Stoltz | |
| 2004/0248382 A1 | 12/2004 | Hatai et al. | |
| 2007/0277916 A1 | 12/2007 | Halander et al. | |
| 2010/0296362 A1 | 11/2010 | Halander et al. | |
| 2011/0132505 A1 | 6/2011 | Dlugogorski et al. | |
| 2013/0276737 A1 | 10/2013 | Hassan et al. | |
| 2013/0327456 A1 | 12/2013 | Goodridge et al. | |
| 2014/0155259 A1 | 6/2014 | Tian et al. | |
| 2014/0216289 A1 | 8/2014 | Halander et al. | |
| 2014/0311634 A1 | 10/2014 | Mcphail et al. | |
| 2014/0367604 A1 | 12/2014 | Alexander | |
| 2015/0101993 A1 | 4/2015 | Fabiyi | |
| 2016/0033249 A1 | 2/2016 | Alexander | |
| 2016/0145165 A1 | 5/2016 | Zank et al. | |
| 2017/0204020 A1 | 7/2017 | Senules | |
| 2019/0233347 A1 | 8/2019 | Halander et al. | |
| 2022/0146243 A1 | 5/2022 | Terry et al. | |
| 2023/0159407 A1 | 5/2023 | Halander et al. | |
| 2025/0130029 A1 | 4/2025 | Halander et al. | |

FOREIGN PATENT DOCUMENTS

| | | |
|---|---|---|
| CN | 213680459 U | 7/2021 |
| EP | 0109747 A2 | 5/1984 |
| EP | 0157594 A2 | 10/1985 |
| EP | 0322097 B1 | 1/1994 |
| EP | 1207145 | 7/1999 |
| EP | 1002777 A1 | 5/2000 |
| GB | 1362352 A | 8/1974 |
| RU | 2326725 C2 | 6/2008 |
| RU | 2632450 C2 | 10/2017 |
| WO | 2001060504 | 8/2001 |
| WO | 2007086950 A2 | 8/2007 |
| WO | 2013013272 A1 | 1/2013 |
| WO | 2014123562 A1 | 8/2014 |
| WO | 2015140462 A1 | 9/2015 |
| WO | 2019201851 A1 | 10/2019 |

OTHER PUBLICATIONS

International Search Report and Written Opinion dated Aug. 13, 2025 for PTC/US2024/051831.

International Search Report and Written Opinion dated Aug. 13, 2025 for PCT/US2024/051837.

Office Action dated Sep. 20, 2024 for U.S. Appl. No. 17/819,517.

Notice of Allowance dated Jan. 29, 2025 for U.S. Appl. No. 16/219,413.

Office Action dated Jun. 20, 2024 for U.S. Appl. No. 17/819,517.

Extended European Search Report dated Sep. 8, 2021 for EP19743345.1.

International Search Report and Written Opinion dated May 13, 2019 for PCT/US2019/015241.

Bhandari , "Engineering Rock Blasting Operations", Depart of Mining Engineering, J.N.V. University, Jodhpur, India, A.A. Balkema/Rotterday/Brookfield, 1997.

* cited by examiner

MECHANICALLY-GASSED EMULSION EXPLOSIVES AND METHODS RELATED THERETO

CROSS-REFERENCE TO RELATED APPLICATIONS

This application is a continuation of U.S. patent application Ser. No. 16/258,298, entitled "MECHANICALLY-GASSED EMULSION EXPLOSIVES AND METHODS RELATED THERETO," filed Jan. 25, 2019, which claims priority to U.S. Provisional Application No. 62/623,324, entitled "MECHANICALLY-GASSED EMULSION EXPLOSIVES AND METHODS RELATED THERETO," filed Jan. 29, 2018, each of which is incorporated herein by reference in its entirety.

TECHNICAL FIELD

The present disclosure relates generally to the field of explosive compositions. More particularly, the present disclosure relates to mechanically-gassed emulsion explosives and methods related thereto.

BRIEF DESCRIPTION OF THE DRAWINGS

The written disclosure herein describes illustrative embodiments that are non-limiting and non-exhaustive. Reference is made to certain of such illustrative embodiments that are depicted in the figures, in which.

DETAILED DESCRIPTION

Figure 1:
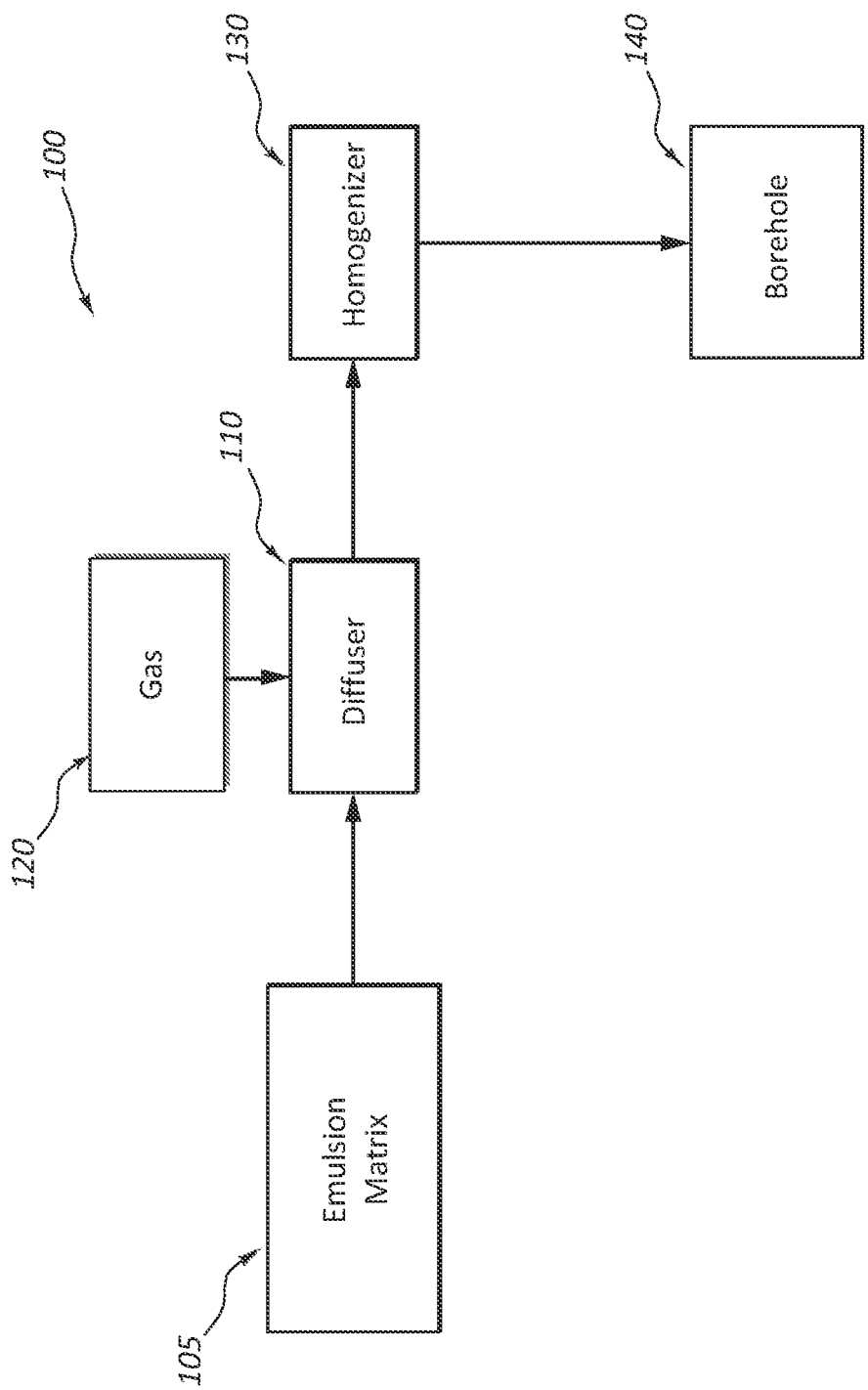
FIG. 1 is a schematic diagram illustrating one embodiment of a process flow for manufacturing mechanically-gassed emulsion explosive.

This disclosure generally relates to water-in-oil (or melt-in-oil) emulsions for use as explosives, along with related methods. The term "water-in-oil" means a dispersion of droplets of an aqueous solution or water-miscible melt (the discontinuous phase) in an oil or water-immiscible organic substance (the continuous phase). The water-in-oil emulsion explosives of this invention contain a water-immiscible organic fuel as the continuous phase and an emulsified inorganic oxidizer salt solution or melt as the discontinuous phase. (The terms "solution" or "melt" hereafter shall be used interchangeably.)

Emulsion explosives are commonly used in the mining, quarrymg, and excavation industries for breaking rocks and ore. Generally, a hole, referred to as a "blasthole" or "borehole," is drilled in a surface, such as the ground. Emulsion explosives may then be pumped or augered into the blasthole. Emulsion explosives are generally transported to a job site or made on the job site as an emulsion that is too dense to completely detonate, referred to as an emulsion matrix. The emulsion matrix is not considered an explosive. In general, the emulsion matrix needs to be "sensitized" in order for the emulsion matrix to detonate successfully. A sensitized emulsion matrix is considered an emulsion explosive.

Sensitizing is often accomplished by introducing small voids into the emulsion matrix. These voids act as hot spots for propagating detonation. These voids may be introduced by injecting a gas into the emulsion and thereby forming discrete gas bubbles, adding microspheres, other porous media, and/or injecting chemical gassmg agents to react m the emulsion and thereby form discrete gas bubbles.

The emulsion matrix can be designed to be repumpable. A repumpable emulsion matrix can be manufactured at a facility and then pumped into a storage reservoir of a mobile processing unit (e.g., transport truck). The repumpable emulsion matrix can then be safely and economically pumped again on the mobile processing unit to provide sufficient kinetic energy to process the emulsion matrix into an emulsion explosive and delivery the emulsion explosive to a borehole.

The emulsion matrix can also be manufactured on site. This is referred to as site-mixed emulsion matrix. Site-mixed emulsion matrix may not necessarily be designed to be repumpable. Instead, for example, the emulsion matrix may be manufactured under sufficient pressure so that residual pressure provides sufficient kinetic energy to complete processing of the emulsion matrix into an emulsion explosive and deliver the emulsion explosive to a borehole.

In the present disclosure, the introduction of gas bubbles into the emulsion matrix may be accomplished mechanically, such as via compressed gas that is delivered to the emulsion matrix through a porous member of a diffuser. The sensitized emulsion explosive may then be subjected to shear stress, thereby increasing the viscosity of the emulsion explosive. The resulting homogenized emulsion explosive may be used for any suitable purpose, such as for detonation in boreholes. In some embodiments, the homogenized emulsion explosive lacks or is substantially devoid of gas bubble stabilizing agents, such as haloalkyl esters, small particles, and proteins. In some embodiments, the homogenized emulsion includes emulsifiers, homogenizing agents, or both. Specific features of particular embodiments of this disclosure are discussed in additional detail below.

The phrase "fluid communication" is used in its ordinary sense, and is broad enough to refer to arrangements in which a fluid (e.g., a gas or a liquid) can flow from one element to another element. The phrase "bubble stabilizing agent" or "foaming agent" refers to a composition that reduces the rate of bubble coalescence in a gas-infused emulsion relative to an essentially identical gas-infused emulsion that lacks the bubble stabilizing agent. The phrase "homogenizing agent" refers to a composition that promotes an increase in viscosity of an emulsion upon subjection of the emulsion to shear stress. Such homogenizing agents may promote the formation of relatively small droplets of the oxidizer phase upon subjection of the emulsion to shear stress. The term "emulsifier" refers to a composition that stabilizes the liquid interface between different liquids in an emulsion. A composition may function as both a homogenizing agent and an emulsifier.

In some embodiments, a homogenized emulsion explosive having a relatively high viscosity may be manufactured by first obtaining a relatively low viscosity emulsion matrix that includes a discontinuous phase of oxidizer salt solution droplets in a continuous phase of a fuel. The fuel may be a mixture of a diesel fuel (which may alternatively be referred to as "fuel oil," or in specific embodiments "fuel oil #2") and an emulsifier, such as a fatty acid. In some embodiments, the emulsion matrix is about 90% to about 96% oxidizer salt solution and about 4%-10% fuel (weight per weight), such as about 94% oxidizer salt solution and about 6% fuel. In some embodiments, the oxidizer salt solution is about 70% to about 90% ammonium nitrate by weight.

In some embodiments, the homogenized emulsion explosive lacks a bubble stabilizing agent, such as haloalkyl esters (including fluoroaliphatic polymer esters), small particles (such as silica particles, iodipamide ethyl ester particles, and various colloidal particles), and proteins. By way of example, the homogenized emulsion explosives may be devoid of any haloalkyl esters, small particles, and proteins. The excluded small particles may range in size from sub-micron (e.g., 20 nm) to 50 microns in size. Stated differently, the homogenized emulsion explosives may lack foaming agents or surfactants that stabilize gas bubbles in the emulsion.

In contrast to bubble stabilizing agents, in some embodiments, the emulsion comprises an emulsifier, a homogenizing agent, or both. The emulsifier may be chosen from any suitable emulsifier and may be part of the fuel, and thus, part of the continuous phase. For example, the fuel may include up to 25 weight percent of an emulsifier, homogenizing agent, or both. For example, the homogenizing agent may be from 20 percent to 100 percent of the emulsifier/homogenizing agent in the fuel. Thus, for example, when the fuel is about 6 weight percent of the homogenized emulsion, the homogenizing agent may be about 0.3% to about 1.5% of the homogenized emulsion, by weight.

Examples of emulsifiers and homogenizing agents that may be selected for use include alcohol alkoxylates, phenol alkoxylates, poly(oxyalkylene) glycols, poly(oxyalkylene) fatty acid esters, amine alkoxylates, fatty acid esters of sorbitol and glycerol, fatty acid salts, sorbitan esters, poly(oxyalkylene) sorbitan esters, fatty amme alkoxylates, poly(oxyalkylene)glycol esters, fatty acid amides, fatty acid amide alkoxylates, fatty amines, quaternary ammes, alkyloxazolines, alkenyloxazolines, imidazolines, alkylsulfonates, alkylarylsulfonates, alkylsulfosuccinates, alkylphosphates, alkenylphosphates, phosphate esters, lecithin, copolymers of poly(oxyalkylene) glycols, and poly(I2-hydroxystearic acid). In some embodiments, the emulsifier is polyisobutenyl succinic anhydride (PIBSA). For example, PIBSA may be used as an emulsifier in repumpable emulsion matrix. In some embodiments, the emulsifier is sorbitan monooleate. For example, sorbitan monooleate may be used in a site-mixed emulsion matrix.

Certain embodiments of manufacturing mechanically-gassed emulsion explosive are described in connection with the process flow 100 shown in FIG. 1. For example, the process flow 100 can be used with a repumpable emulsion matrix, whether formed on-site or elsewhere.

The emulsion matrix 105 may initially have a viscosity of about 4,000 to about 20,000 cP, such as about 6,000 cP to about 8,000 cP, about 7,000 cP to about 10,000 cP, about 8,000 cP to about 14,000 cP, about 10,000 cP to about 20,000 cP, about 12,000 cP to about 20,000 cP, or about 15,000 cP to about 20,000 cP. In other words, immediately prior to delivery into a diffuser (as described below), the emulsion matrix 105 may have a relatively low viscosity (e.g., below 20,000 cP). The viscosity can be measured with a Brookfield viscometer, such as a Model #HADVII+ with an LV-3 spindle at 20 rpm and temperature at 20° C.

The emulsion matrix 105 may then be "sensitized" by introducing gas bubbles into the emulsion matrix 105. Gas bubbles may be mechanically introduced into the emulsion matrix 105. For example, in process flow 100, mechanically introducing a gas into the emulsion matrix 105 comprises delivering gas 120 through a porous member of a diffuser 110 and into the emulsion matrix 105.

A compressed gas, such as compressed nitrogen, helium, a noble gas, or compressed air, may be delivered through the diffuser 110. In other words, the compressed gas 120 may be in fluid communication with a flow path for passage of the emulsion matrix 105, thereby enabling the mechanical delivery of gas through the diffuser 110 and into the emulsion matrix 105 in the flow path.

As pressurized gas is delivered to the diffuser 110, the emulsion matrix 105 may be pushed (such as via pressure supplied by pumping the emulsion matrix 105 prior to the diffuser 110) through the flow path and exit from the diffuser 110. As the emulsion matrix 105 travels through the diffuser 110, pressurized gas within the diffuser 110 may pass through a porous member of the diffuser 110 and enter into the emulsion matrix 105, thereby forming gas bubbles in the emulsion matrix 105. In this manner, gas may be mechanically delivered to the emulsion matrix 105, thereby sensitizing the emulsion matrix 105 for detonation.

In some embodiments, the porous member comprises a porous ceramic, a sintered glass, and/or sintered steel. Other porous materials may also be used to form the porous member. The pore size may be about 1 to 5 microns, or smaller. For example, the pore size may be in the nanometer range. The median bubble size may be about 1 to 10 microns. The median bubble size can be determined by photomicroscopy.

The introduction of gas into the emulsion matrix 105 will decrease the density of the emulsion matrix 105. The flow rate of the gas 120 may be selected to achieve a desired density of the resulting emulsion explosive.

After the emulsion matrix 105 has been sensitized via the introduction of gas bubbles, the resulting emulsion explosive may be delivered to a homogenizer 130. The homogenizer 130 may alter the size distribution of oxidizer salt solution droplets in the emulsion explosive. For instance, in some embodiments, the homogenizer 130 disrupts relatively large droplets of oxidizer salt solution, thereby converting such droplets into smaller droplets that have a more narrow size distribution. Such manipulation of the oxidizer salt solution droplets may cause an increase (e.g., a significant increase) in the viscosity of the homogenized emulsion explosive.

In some embodiments, homogenization is achieved by subjecting the emulsion explosive to shear stress. The homogenizer 130 may comprise a device, such as a valve, configured to introduce a shearing stress on the emulsion explosive (i.e., on the gassed emulsion matrix 105). The kinetic energy for passing the emulsion explosive through the homogenizer 130 may be provided by pumping the emulsion matrix 105 at sufficient pressure prior to the diffuser 110.

In some embodiments, the viscosity of the homogenized emulsion explosive may, due to homogenization, be increased relative to emulsion matrix 105 by more than about 45,000 cP, such as by at least about 50,000 cP, at least about 60,000 cP, at least about 80,000 cP, or at least about 100,000 cP. In some embodiments, the viscosity of the homogenized emulsion explosive relative to the emulsion matrix 105 may be increased by about 45,000 cP to about 75,000 cP, about 60,000 cP to about 90,000 cP, about 75,000 cP to about 105,000 cP, or about 90,000 cP to about 140,000 cP. In some embodiments, the viscosity of the homogenized emulsion explosive may be greater than or equal to 80,000 cP. For example, the homogenized emulsion explosive may have a viscosity of about 80,000 cP to about 150,000 cP, such as about 80,000 cP to about 100,000 cP, about 90,000 cP to about 120,000 cP, about 105,000 cP to about 135,000 cP, or about 120,000 cP to about 150,000 cP.

The homogenized emulsion explosive may be delivered into a borehole 140 for detonation. Stated differently, the homogenized emulsion explosive may be delivered through a hose and placed within a borehole 140 for subsequent detonation.

Figure 2:
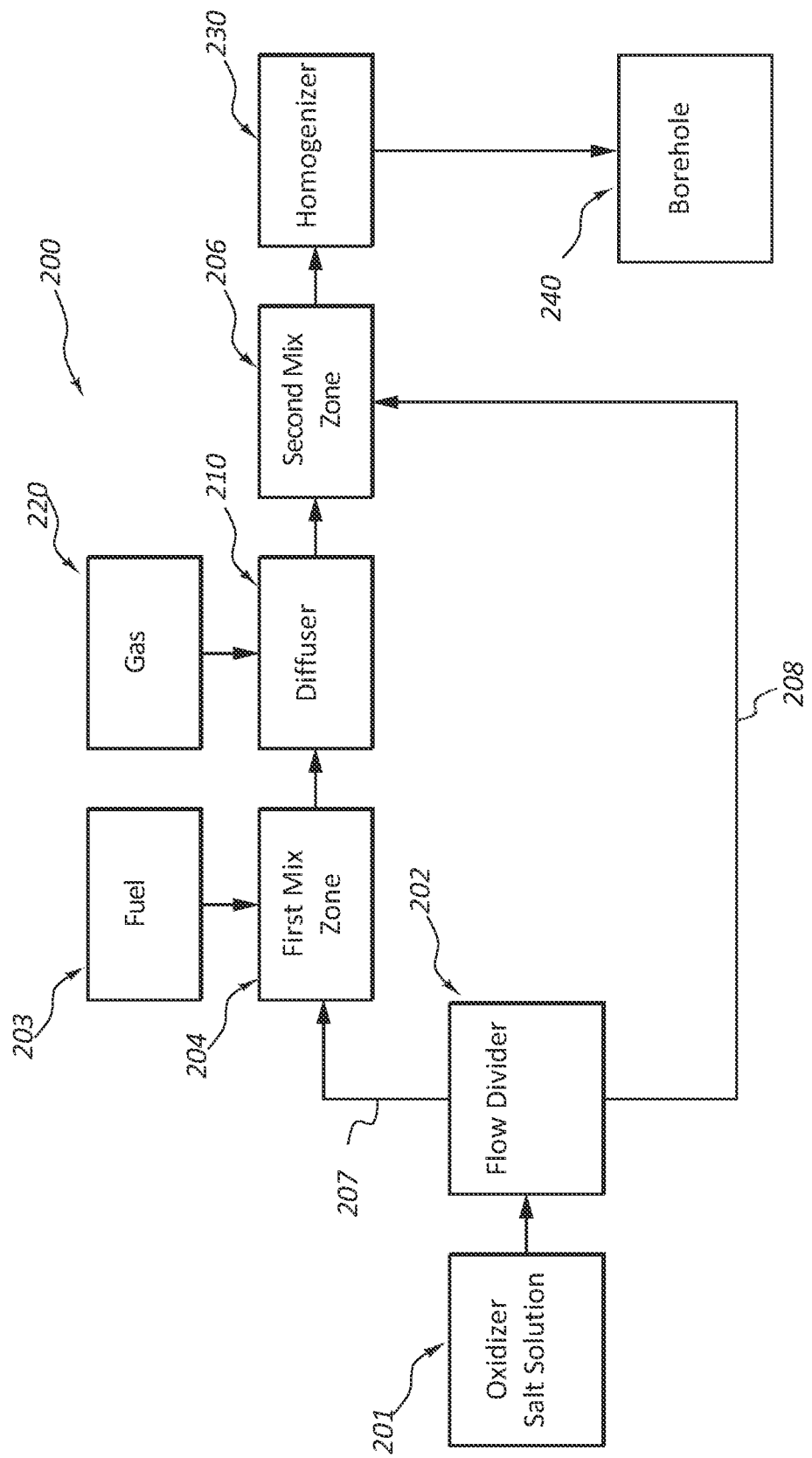
FIG. 2 is another schematic diagram illustrating another embodiment of a process flow for manufacturing a mechanically-gassed emulsion explosive.

FIG. 2 depicts an embodiment of a process flow 200 that resembles the process flow 100 described above in certain respects. Accordingly, like features are designated with like reference numerals, with the leading digits incremented to "2." For example, the embodiment depicted in FIG. 2 includes a diffuser 210 that may in some or all respects resemble the diffuser 110 of FIG. 1. Likewise, FIG. 2 includes a homogenizer 230 that may in some or all respects resemble the homogenizer 130 of FIG. 2. Relevant disclosure set forth above regarding similarly identified features thus may not be repeated hereafter. Moreover, specific elements of process flow 100 shown or described in connection with FIG. 1 may not be shown or identified by a reference numeral in the drawings or specifically discussed in the written description that follows. However, such features may clearly be the same, or substantially the same, as features depicted in other embodiments and/or described with respect to such embodiments. Accordingly, the relevant descriptions of such features apply equally to the features of the process flow 200 and related components depicted in FIG. 2. Any suitable combination of the features, and variations of the same, described with respect to the process flow 100 and related elements illustrated in FIG. 1 can be employed with the process flow 100 and related components of FIG. 2, and vice versa.

The process flow 200 shown in FIG. 2 is generally similar to the process flow 100 described above. However, in contrast with the process flow 100 shown in FIG. 1, the process flow 200 relates specifically, instead of optionally, to site-mixed emulsion matrix. In this illustrated embodiment, the oxidizer salt solution 201 is split into a first portion and a second portion. The first portion of the oxidizer salt solution 201 is mixed with the fuel 203 to form a low viscosity fuel-rich emulsion matrix. The fuel 203 is substantially devoid of an additive that stabilizes gas bubbles.

The fuel-rich emulsion matrix is passed through the diffuser 210 to form a fuel-rich emulsion explosive. The second portion of the oxidizer salt solution 201 is then mixed with the fuel-rich emulsion explosive to form a more-balanced emulsion explosive with increased viscosity ("more-balanced" referring to the oxygen-balance of the emulsion explosive). The more-balanced emulsion explosive is then homogenized to form a homogenized emulsion explosive with further increased viscosity.

In some embodiments, the oxidizer salt solution 201 is pumped from the one or more containers through a flow divider 202 that divides (e.g., bifurcates) the oxidizer salt solution in different directions. For example, the flow divider 202 may direct the first portion of the oxidizer salt solution 201 to a first path 207 that leads to a first mix zone 204, while the flow divider also directs a second portion of the oxidizer salt solution 201 to a second path 208 that bypasses the first mix zone to a second mix zone 206. In some embodiments, an equal amount of oxidizer salt solution is directed to the first flow path 207 (i.e., toward the first mix zone 204) and to the second flow path 208 (i.e., toward the second mix zone 206). In other embodiments, a higher percentage of the oxidizer salt solution is directed to the second flow path 208 than to the first flow path 207. For example, in some embodiments, 55% to 65% of the oxidizer salt solution is directed to the second flow path 208, while 35% to 45% of the oxidizer salt solution is directed to the first flow path 207. Alternatively, a higher percentage of the oxidizer salt solution may be directed to the first flow path 207 than to the second flow path 208. In other embodiments, instead of being connected to a single flow divider 202, the first flow path 207 and the second flow path 208 are each connected to different containers of oxidizer salt solution 201.

After passing through the flow divider 202, the first portion of the oxidizer salt solution 201 enters into the first mix zone 204. The first mix zone 204 is configured to facilitate the mixing of oxidizer salt solution 201 with the fuel 203, such as diesel fuel and emulsifier. In other words, both oxidizer salt solution 201 and fuel 203 may be pumped into the first mix zone 204. The oxidizer salt solution 201 and fuel 203 may be mixed within the first mix zone to create a fuel-rich emulsion matrix. As the fuel-rich emulsion matrix exits the first mix zone 204, the fuel-rich emulsion matrix may have a relatively low viscosity, such as about 8,000 cP to about 14,000 cP.

From the first mix zone 204, the fuel-rich emulsion matrix may then travel into the diffuser 210. The diffuser 210 may be generally analogous to the diffuser 110 described above. For instance, the diffuser 210 may be configured to receive compressed gas 220 and mechanically introduce gas bubbles into the emulsion matrix that passes through the diffuser 210. In this manner, the fuel-rich emulsion matrix may be sensitized.

After exiting the diffuser 210, the fuel-rich emulsion explosive may enter into a second mix zone 206. The second mix zone 206 may be configured to receive the second portion of the oxidizer salt solution 201 that is delivered through the second flow path 208, thereby facilitating mixing of the second portion of oxidizer salt solution 201 with the fuel-rich emulsion explosive that enters the second mix zone 206. In some embodiments, the second portion of the oxidizer salt solution is about 45% to about 80% of the total amount of oxidizer salt solution 201 in the resulting emulsion on a weight per weight basis. The mixing of the second portion of oxidizer salt solution 201 with the fuel-rich emulsion explosive may increase the viscosity of the more-balanced emulsion explosive. For example, in some embodiments, the viscosity of the more-balanced emulsion explosive, relative to the fuel-rich emulsion explosive, is increased by about 6,000 cP to about 20,000 cP (e.g., by about 6,000 cP to about 12,000 cP; about 9,000 cP to about 15,000 cP, about 12,000 cP to about 18,000 cP, or about 15,000 cP to about 20,000 cP). The viscosity of the more-balanced emulsion explosive may be about 20,000 cP to about 35,000 cP, such as about 20,000 cP to about 26,000 cP; about 23,000 cP to about 29,000 cP, about 26,000 cP to about 32,000 cP, or about 29,000 cP to about 35,000 cP.

The more-balanced emulsion explosive may then enter into a homogenizer 230. The homogenizer 230 may manipulate the more-balanced emulsion explosive to alter the size distribution of oxidizer salt solution 201 droplets in the emulsion. For instance, in some embodiments, the homogenizer 230 disrupts relatively large droplets of oxidizer salt solution 201, thereby converting such droplets into smaller droplets that have a more narrow size distribution. Such manipulation of the oxidizer salt solution droplets may cause an increase (e.g., a significant increase) in the viscosity of the emulsion. Pressurizing the oxidizer salt solution 201 may provide at least a portion of the pressure necessary to homogenize the more-balanced emulsion explosive. Homogenization may also reduce gas bubble size and make the distribution of the gas bubbles more uniform (i.e., more homogeneous) in the emulsion.

For example, the viscosity of the homogenized emulsion explosive may be increased, relative to the more-balanced emulsion explosive, by more than about 45,000 cP, such as by at least about 50,000 cP, at least about 60,000 cP, at least about 80,000 cP, or at least about 100,000 cP. In some embodiments, the viscosity of the homogenized emulsion explosive may be increased by about 45,000 cP to about 75,000 cP, about 60,000 cP to about 90,000 cP, about 75,000 cP to about 105,000 cP, or about 90,000 cP to about 140,000 cP. For example, the viscosity of the homogenized emulsion explosive may be greater than or equal to 80,000 cP. For example, the homogenized emulsion explosive may have a viscosity of about 80,000 cP to about 150,000 cP, such as about 80,000 cP to about 100,000 cP, about 90,000 cP to about 120,000 cP, about 105,000 cP to about 135,000 cP, or about 120,000 cP to about 150,000 cP.

The diffuser 210 of FIG. 2 is shown as a distinct component from both the first mix zone and the second mix zone. However, in other embodiments, a diffuser may be integrated with a first mix zone or a second mix zone. For example, in some embodiments, the mix zone includes two inlets for delivering liquids or emulsions and a third inlet for delivery of compressed air through a porous member. The inputs from each inlet may combine together to form a gassed emulsion. Stated differently, the input from the first inlet, the input from the second inlet, and the compressed gas from the third inlet may combine at a single location within with a mix zone to form a gas-infusion emulsion. The resulting gas-infusion emulsion may exit from the mix zone through an outlet for delivery to, for example, another mix zone or a homogenizer.

The increased viscosity of the homogenized emulsion explosive, whether repumped or site-mixed, may reduce gas bubble migration and/or gas bubble coalescence, thereby resulting in an emulsion explosive of increased compositional stability. In other words, due at least in part to the increase in viscosity of the homogenized emulsion explosive, the gas bubbles within the emulsion may have decreased mobility and/or a decreased propensity to merge with other gas bubbles.

By contrast, a mechanically gassed emulsion explosive of relatively low viscosity, that does not include a bubble stabilization agent, tends to have bubble migration and coalescence problems. When the gas-infused emulsion explosive of relatively low viscosity, that does not include a bubble stabilization agent, is placed in a borehole, gas bubbles in the emulsion may migrate upwards (due to the low density of gas relative to the emulsion), thereby resulting a composition in which gas bubbles are unevenly distributed throughout the emulsion. The uneven distribution of gas bubbles leads to emulsion explosives of decreased homogeneity, undesired performance, and potential undetonability. Bubbles within an emulsion of relatively low viscosity may also, due in part to their increased mobility, tend to coalesce with other gas bubbles. The increased coalescence of gas bubbles an emulsion explosive also results in decreased homogeneity, undesired performance, and potentially undetonability.

Embodiments of mechanically-gassed homogenized emulsion explosives described herein that have a relatively high viscosity may be more resistant to gas bubble migration and/or coalescence without the need for a bubble stabilization agent.

One of ordinary skill in the art, with the benefit of this disclosure, would understand that any number of systems can be used to implement the processes described herein. Additionally, one of ordinary skill in the art, with the benefit of this disclosure, would understand that the mechanically-gassed homogenized emulsion explosives described herein may be additionally processed in other ways that are known in the art.

For example, a lubricant, such as water, may be introduced while the homogenized emulsion matrix is delivered through a conduit to a borehole.

Additional components, such as solid sensitizers and/or energy increasing agents, may be mixed with the homogenized emulsion explosives. Examples of solid sensitizers include, but are not limited to, glass or hydrocarbon microballoons, cellulosic bulking agents, expanded mineral bulking agents, and the like. Examples of energy increasing agents include, but are not limited to, metal powders, such as aluminum powder, and solid oxidizers. Examples of the solid oxidizer include, but are not limited to, oxygen-releasing salts formed into porous spheres, also known in the art as "prills." Examples of oxygen-releasing salts include ammonium nitrate, calcium nitrate, and sodium nitrate. Any solid oxidizer known in the art and compatible with the fuel of the homogenized emulsion explosive may be used. The homogenized emulsion explosives may also be blended with explosive mixtures, such as ammonium nitrate fuel oil ("ANFO") mixtures.

The mechanically-gassed homogenized emulsion explosives described herein can be used as bulk explosives, both in above ground and underground applications. All of the method steps described herein may be performed via a mobile processing unit. Once disposed within a borehole, the mechanically-gassed homogenized emulsion explosive may be detonated in any suitable manner. For example, the mechanically-gassed homogenized emulsion explosives described herein with low enough water may be sufficiently sensitized to be detonated with a No. 8 blasting cap when unconfined or in a blasthole above the critical diameter for the particular density.

Any methods disclosed herein include one or more steps or actions for performing the described method. The method steps and/or actions may be interchanged with one another. In other words, unless a specific order of steps or actions is required for proper operation of the embodiment, the order and/or use of specific steps and/or actions may be modified. Moreover, sub-routines or only a portion of a method described herein may be a separate method within the scope of this disclosure. Stated otherwise, some methods may include only a portion of the steps described in a more detailed method.

Reference throughout this specification to "an embodiment" or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Similarly, it should be appreciated by one of skill in the art with the benefit of this disclosure that in the above description of embodiments, various features are sometimes grouped together in a single embodiment, figure, or description thereof for the purpose of streamlining the disclosure. This method of disclosure, however, is not to be interpreted as reflecting an intention that any claim requires more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. It will be apparent to those having skill in the art that changes may be made to the details of the above—described embodiments without departing from the underlying principles of the present disclosure.

The invention claimed is:

1. A method of delivering an emulsion explosive, the method comprising:
   splitting an oxidizer salt solution into a first portion and a second portion;
   mixing the first portion of the oxidizer salt solution with a fuel and a pressurized gas to form a low viscosity fuel-rich emulsion explosive, wherein the fuel is substantially devoid of a bubble stabilizing agent;
   mixing the second portion of the oxidizer salt solution into the fuel-rich emulsion explosive to form a more-balanced emulsion explosive with increased viscosity by about 6,000 cP to about 20,000 cP relative to the fuel-rich emulsion explosive; and
   homogenizing the more-balanced emulsion explosive to form a homogenized emulsion explosive with further increased viscosity relative to the more-balanced emulsion explosive.

2. The method of claim 1, further comprising homogenizing the more-balanced emulsion explosive until the homogenized emulsion explosive has a viscosity of greater than or equal to about 80,000 cP.

3. The method of claim 1, further comprising homogenizing the more-balanced emulsion explosive until the homogenized emulsion explosive has a viscosity of about 80,000 cP to about 150,000 cP.

4. The method of claim 1, wherein the second portion of the oxidizer salt solution is about 45% to about 80% of the total amount of the oxidizer salt solution, on a weight-per-weight basis.

5. The method of claim 1, further comprising flowing the homogenized emulsion explosive through a conduit into a borehole.

6. The method of claim 1, further comprising pressurizing the oxidizer salt solution to provide at least a portion of the pressure necessary to homogenize the emulsion explosive.

7. The method of claim 1, wherein the first portion of the oxidizer salt solution is mixed with the fuel before mixing the first portion and the fuel with the pressurized gas.

8. The method of claim 1, wherein the first portion of the oxidizer salt solution is mixed with the fuel and the pressurized gas simultaneously.

9. The method of claim 1, wherein the fuel further comprises an emulsifier, a homogenization agent, or combinations thereof.

10. A method of delivering an emulsion explosive, the method comprising:
    splitting an oxidizer salt solution into a first portion and a second portion;
    mixing the first portion of the oxidizer salt solution with a fuel to form a low viscosity fuel-rich emulsion matrix, wherein the fuel is substantially devoid of a bubble stabilizing agent;
    mechanically introducing gas bubbles into the preliminary emulsion matrix to sensitize the fuel-rich emulsion matrix and form a fuel-rich emulsion explosive;
    mixing the second portion of the oxidizer salt solution into the fuel-rich emulsion explosive to form a more-balanced emulsion explosive with increased viscosity; and
    homogenizing the more-balanced emulsion explosive to form a homogenized emulsion explosive with further increased viscosity.

11. The method of claim 10, wherein the fuel-rich emulsion matrix is formed to have an initial viscosity of about 20,000 cP or less.

12. The method of claim 10, further comprising homogenizing the more-balanced emulsion explosive until the homogenized emulsion explosive has a viscosity of greater than or equal to about 80,000 cP.

13. The method of claim 10, wherein mechanically introducing gas bubbles comprises diffusing microbubbles with a median bubble size of about 1 to 10 microns.

14. The method of claim 10, wherein the more-balanced emulsion explosive has increased viscosity by more than 6,000 cP, relative to the fuel-rich emulsion matrix.

15. The method of claim 10, wherein the second portion of the oxidizer salt solution is about 45% to about 80% of the total amount of the oxidizer salt solution, on a weight-per-weight basis.

16. The method of claim 10, further comprising flowing the homogenized emulsion explosive through a conduit into a borehole.

17. The method of claim 10, further comprising pressurizing the oxidizer salt solution to provide at least a portion of the pressure necessary to homogenize the emulsion explosive.

18. The method of claim 10, wherein the fuel further comprises an emulsifier, a homogenization agent, or combinations thereof.

* * * * *